(12) United States Patent
Baker

(10) Patent No.: US 9,913,551 B1
(45) Date of Patent: Mar. 13, 2018

(54) MAGNETIC PILLOW FRAME

(71) Applicant: Jean M. Baker, Flower Mound, TX (US)

(72) Inventor: Jean M. Baker, Flower Mound, TX (US)

(*) Notice: Subject to any disclaimer, the term of this patent is extended or adjusted under 35 U.S.C. 154(b) by 40 days.

(21) Appl. No.: 14/848,290

(22) Filed: Sep. 8, 2015

Related U.S. Application Data

(60) Provisional application No. 62/046,739, filed on Sep. 5, 2014.

(51) Int. Cl.
| | |
|---|---|
| *A47G 9/04* | (2006.01) |
| *A47G 9/10* | (2006.01) |
| *F16B 1/00* | (2006.01) |
| *D05B 35/06* | (2006.01) |

(52) U.S. Cl.
CPC ............. *A47G 9/04* (2013.01); *A47G 9/10* (2013.01); *D05B 35/06* (2013.01); *F16B 1/00* (2013.01); *A47G 2009/1018* (2013.01); *F16B 2001/0035* (2013.01)

(58) Field of Classification Search
CPC ...... A47G 9/02; A47G 9/0253; A47G 9/1009; A47G 9/1045; A47G 9/10; A47G 2009/004; A47G 9/04; A47G 9/0261
See application file for complete search history.

(56) References Cited

U.S. PATENT DOCUMENTS

| | | | | |
|---|---|---|---|---|
| 834,643 | A * | 10/1906 | Sohnadig | A61F 5/485 5/484 |
| 1,284,459 | A * | 11/1918 | Ross | A47G 9/0253 5/490 |
| 2,659,421 | A * | 11/1953 | Wass | A47C 27/003 112/417 |
| 3,443,267 | A * | 5/1969 | Schuckman | A47G 9/10 5/645 |
| 3,604,026 | A * | 9/1971 | Scheips | A47C 7/383 297/397 |
| 3,840,918 | A * | 10/1974 | Shave | A47G 9/1036 5/421 |
| 4,242,767 | A * | 1/1981 | McMullen | A63H 33/062 297/452.16 |
| 4,249,267 | A | 2/1981 | Voss | |
| 5,144,911 | A * | 9/1992 | Moore | A01K 1/0353 119/28.5 |
| 5,604,960 | A | 2/1997 | Good | |
| 5,727,266 | A * | 3/1998 | Pang | A47G 9/0253 5/490 |
| 6,041,715 | A * | 3/2000 | Jarke | A47B 23/002 108/43 |
| 6,061,854 | A * | 5/2000 | Crowley | A47D 13/083 108/43 |
| 7,065,841 | B2 * | 6/2006 | Sjoquist | A41F 1/002 24/303 |
| 7,178,185 | B1 * | 2/2007 | Nattler | A41D 15/04 2/84 |

(Continued)

*Primary Examiner* — Nicholas Polito
*Assistant Examiner* — Ifeolu Adeboyejo
(74) *Attorney, Agent, or Firm* — Spencer C. Patterson; Grable Martin Fulton PLLC

(57) ABSTRACT

A method, system, and apparatus for covering padded home décor insert forms by means of securing fabric or other pliable materials around or to said inserts using magnets to clasp the fabric or other pliable material around a padded insert.

10 Claims, 4 Drawing Sheets

(56) References Cited

U.S. PATENT DOCUMENTS

| | | | |
|---|---|---|---|
| 7,187,261 B2 | 3/2007 | Cassar | |
| 7,464,423 B2* | 12/2008 | Goodwin | A45C 9/00 |
| | | | 5/640 |
| 8,516,632 B2* | 8/2013 | Ogundare | A47G 9/0253 |
| | | | 5/417 |
| 9,210,953 B2* | 12/2015 | Horton | A41B 1/10 |
| 2004/0019972 A1* | 2/2004 | Schecter | A47G 9/10 |
| | | | 5/645 |
| 2012/0186016 A1* | 7/2012 | Martin | A47C 31/11 |
| | | | 5/490 |
| 2012/0233777 A1* | 9/2012 | Hare | A47C 21/022 |
| | | | 5/498 |
| 2013/0061431 A1 | 3/2013 | Naftali et al. | |
| 2013/0067660 A1* | 3/2013 | Sloan | A47G 9/083 |
| | | | 5/494 |

* cited by examiner

MAGNETIC PILLOW FRAME

RELATED APPLICATION

This application claims priority to U.S. Application No. 62/046,739, filed Sep. 5, 2014, which is incorporated herein by reference in its entirety.

BACKGROUND

This description relates to pillow inserts, seat cushions, or other padded inserts in need of covers, and more particularly to a frame for decorating home furnishings that consist of padded inserts.

Traditional home décor padded inserts such as pillows, cushions, and mattress pads are covered with a decorative fabric case in which the two pieces of fabric are sewn or adhered with thread, elastic, or adhesive. Many coverings are created without a zipper preventing easy removal of the case for sanitizing, removing stains, or changing the room décor.

SUMMARY

This specification describes an apparatus that can be used to seam upholstery fabrics, upholstery cords, or any pliable material or textile, around or to a padded insert with magnets of attractive polarity, or with magnets with one pole that is attracted to a cooperating metal piece on a common plane. Such a magnetic frame seams fabric or other pliable material to, or around, a padded insert with the use of suitable types, gauss levels, poles, and grades of magnetic material. The magnetic frame can be used to secure decorative covers to or around a padded insert. The frame is made with a flexible material that can be sewn, bonded, adhered, surrounded, rested on, or extended from any desired dimension and shape of a padded insert. Such a frame can be used to create a seamed cover without the need to sew, or use adhesive, so that users may change the decorative appearance of the padded insert as often as needed or desired; it also allows for the covering material to be removed for cleaning and ironing. One advantage of this apparatus over an ordinary padded insert cover is that the pillow frame creates a seam that is not permanent, allowing a user to change the material around the padded insert as often as desired without any special tools or crafting skills.

DESCRIPTION OF DRAWINGS

Like reference symbols in the various drawings indicate like elements.

DETAILED DESCRIPTION

In accordance with aspects described in this specification, a padded insert can be covered with a decorative fabric or pliable material that is held in place in front, behind, and/or on each side of the padded insert using magnets and/or ferromagnetic materials. The magnets and ferromagnetic material can be of any suitable size or shape, type, gauss level, polarity, and grade to hold one or more pieces of fabric in place around the padded insert.

Figure 1:
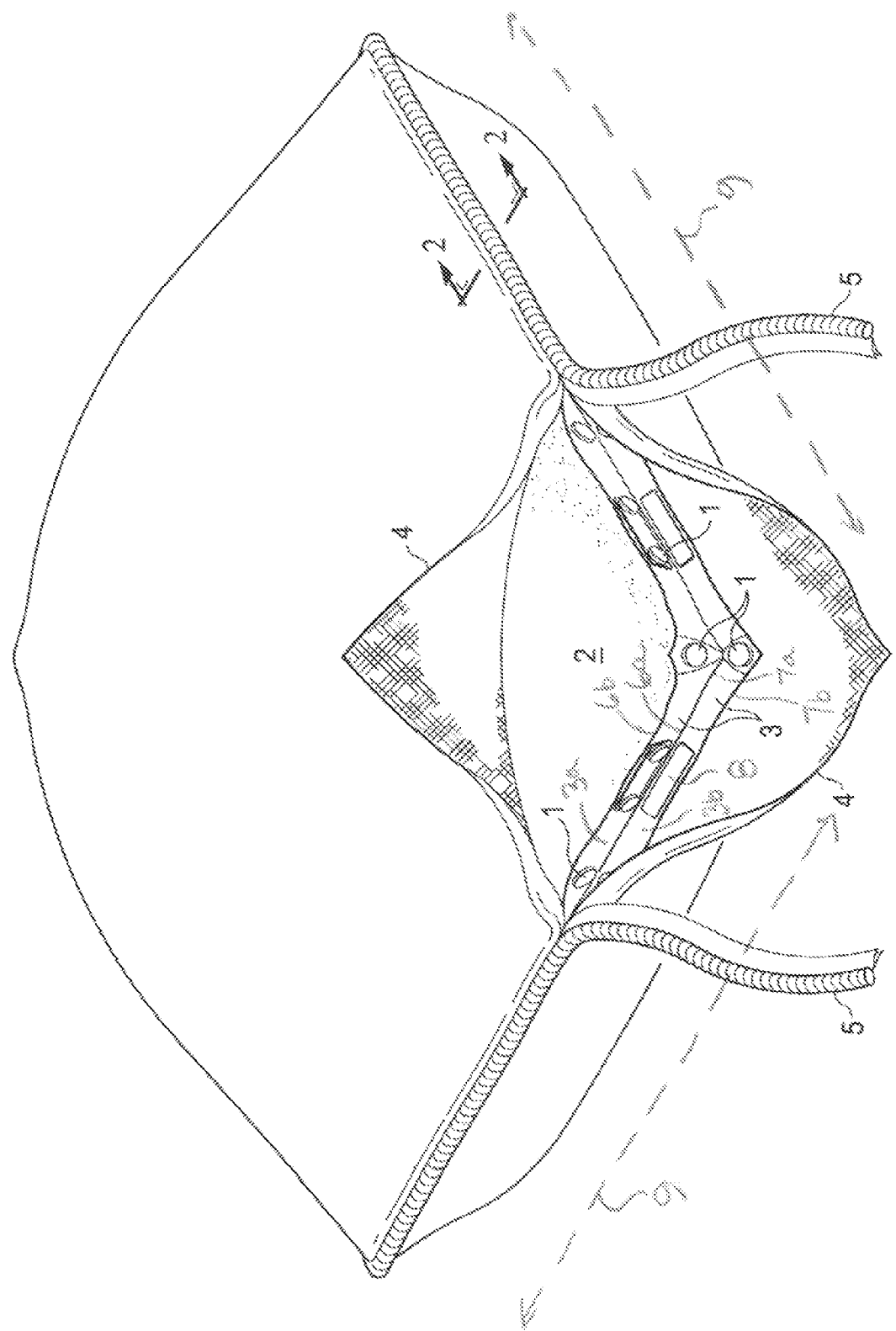
FIG. 1 illustrates a pillow covered in a decorative fabric using a magnetic pillow frame.
Figure 2:
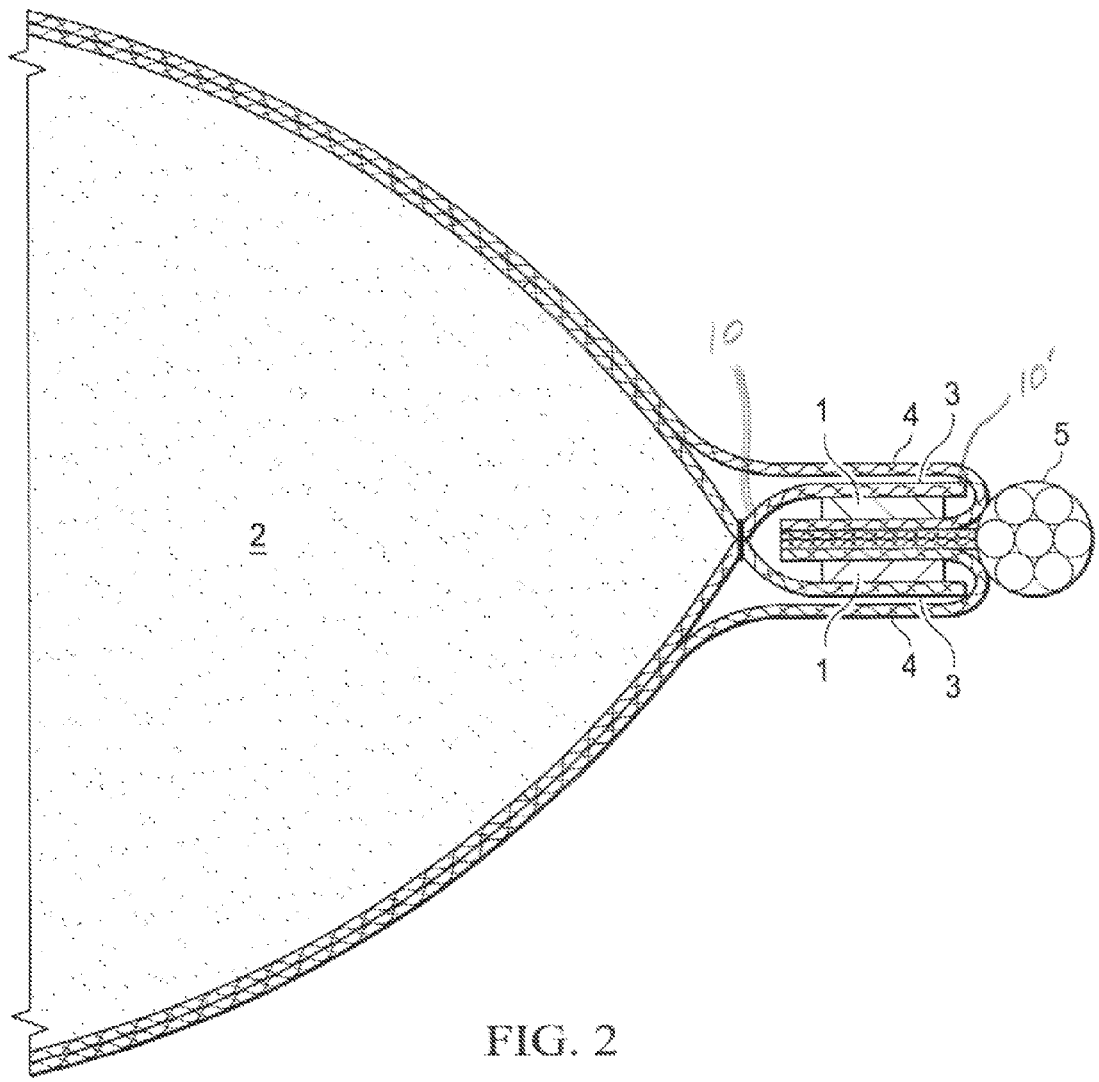
FIG. 2 is a cross-sectional view of a pillow covered in a decorative fabric using a magnetic pillow frame.

FIG. 1 illustrates a pillow covered in a decorative fabric using a magnetic frame. The illustrated pillow includes a padded insert 2 that includes an extension or tab 3 around the perimeter of the padded insert 2 on the front side of the padded insert 2 and a corresponding extension or tab 3 on the back side of the padded insert 2. The extensions or tabs 3 can be created, in one example, by extending a seam allowance of the fabric that envelops the stuffing of the padded insert as depicted in FIG. 2 (i.e., by extending the seam allowance from 10 to 10'). The extensions or tabs 3 can create a channel between the extensions or tabs 3 on the front side of the padded insert 2 and the extensions or tabs 3 on the back side of the padded insert 2. In general, the channel is created as a result of one lateral edge of the extensions or tabs 3 being secured together or being secured to roughly the same location (i.e., affixed in close relative proximity) along a generally longitudinal (or circumferential) dimension of the extensions or tabs 3. The extensions or tabs 3 have a generally longitudinal dimension (e.g., from one corner of the padded insert 2 to the next corner of the padded insert 2 shown in FIG. 1) that is substantially longer than the width of a lateral dimension of the extensions or tabs 3 (e.g., from a base of the channel where the two extensions or tabs 3 meet to the edge of the extensions or tabs 3 at the open end of the channel). The generally longitudinal dimension of the extensions or tabs 3 can also curve (e.g., for a circular or oval shaped pillow form) or can turn at an angle (e.g., a substantially right angle at the corners of a square or rectangular shaped pillow form) without departing from the intended meaning of the longitudinal dimension.

The extensions or tabs 3 include a first tab 3a having a first edge 6a and a second edge 6b extending along a generally longitudinal dimension 9 of the first tab. Magnets 1 are attached along the generally longitudinal dimension 9 of the first tab 3a. The extensions or tabs 3 also include a second tab 3b having a first edge 7a and a second edge 7b extending along the generally longitudinal dimension 9 of the second tab. A ferromagnetic material 8 is attached along the generally longitudinal dimension 9 of the second tab 3b, and the first edge 6a of the first tab 3a is affixed in close proximity to the first edge 7a of the second tab 3b. The first tab 3a and the second tab 3b releasably clamp together as a result of an attractive magnetic force between the magnets 1 and the corresponding ferromagnetic material 8 that causes the respective magnets 1 and ferromagnetic materials 8 of each tab 3a and 3b to clasp a pliable material 4 and hold the material 4 to at least partially envelop the padded insert 2.

Figure 3:
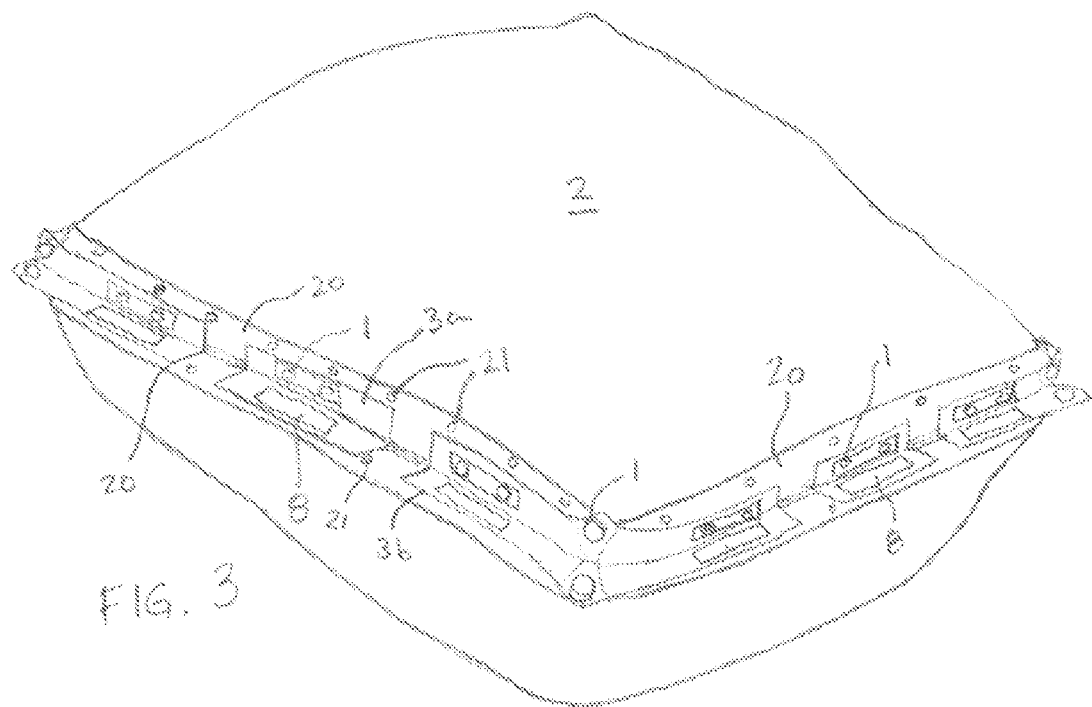
FIG. 3 is an isometric view of a pillow with a removably attached magnetic pillow frame.
Figure 6:
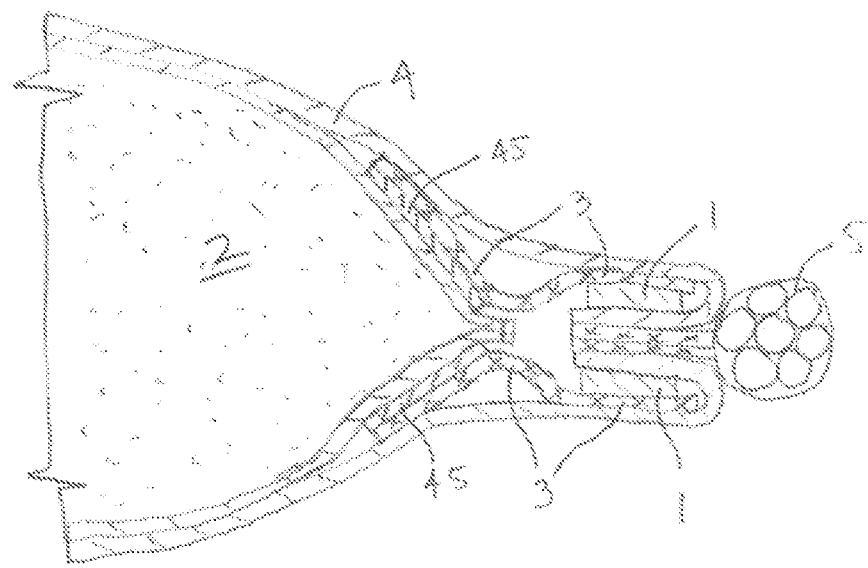
FIG. 6 is a detailed cross-sectional view of a magnetic pillow frame clamping decorative fabric.

In some implementations and as further illustrated in FIG. 3, tabs 3 can be removable (i.e., a detachable frame 20 that can be attached and detached from the padded insert 2 using fasteners, e.g., snaps 21, hook and loop fasteners, buttons, and the like), attachable (e.g., a frame that is separate from the padded insert 2 but that can be attached, for example, by an adhesive), and/or tabs 3 may be a detached frame around insert 2 (e.g., a frame that floats around or rests on the padded insert 2 but that is not otherwise secured to the padded insert 2). The magnets and/or ferromagnetic material can be attached to the padded insert as shown in FIG. 1 and/or can be attached to an independent, attachable, detachable, or detached frame. Adhered to the extensions and/or detachable/detached frame or tabs 3 are magnets 1 that are spaced around the perimeter of the padded insert 2. The magnets 1 can be adhered to the textile extensions, and/or detachable/detached frame or tabs 3, using an adhesive, may be enclosed within a pocket included in the extensions and/or detachable/detached frame or tabs 3, or may be attached to a composite material and adhered to the extensions and/or detachable/detached frame or tabs 3. For example, as shown in FIG. 6, the magnet 1 and ferromagnetic material 8 are each affixed to a composite material 30 and the composite material 30 is affixed to a tab substrate 32 by an adhesive 31. In addition, the magnet 1 and ferromagnetic material 8 are encased between the tab substrate 32 and an encasing fabric 33. The magnets 1 attached to the extension and/or detachable/detached frame or tab 3a on the front side of the padded insert 2 can be situated such that the magnets 1 have an opposite polarity from the corresponding magnets 1 attached to the corresponding extension and/or detachable/detached frame or tab 3b on the back side of the padded insert 2. In particular, a magnet 1 that is attached to the extension and or detachable/detached frame or tab 3a on the front side of the padded insert 2 can have a surface that faces toward the channel created by the extensions and/or detachable/detached frame or tabs 3 that has an opposite polarity from the surface of a corresponding magnet 1 attached to the extension and or detachable/detached frame or tab 3b on the back side of the padded insert 2 that faces toward the channel created by the extensions and/or detachable/detached frame or tabs 3. The opposite polarities can thus provide magnetic attraction that tends to cause the extensions and/or detachable/detached frame or tabs 3 to clamp together, thereby closing the channel between the extensions and/or detachable/detached frame or tabs 3 on the front and back sides of the padded insert 2.

The extensions or tabs 3, in some implementations, are not formed from a continuous substrate material around the perimeter of the padded insert 2 or frame. Instead, the extensions or tabs 3 can include a sequence of extensions or tabs 3 that are spaced apart along the longitudinal dimension of the padded insert 2 or frame (e.g., a space or gap exists between adjacent extensions or tabs 3 as depicted in FIG. 3), that approximately meet at the longitudinal edge of each extension or tab 3 along the longitudinal dimension of the padded insert 2 or frame, or that overlap proximate to the longitudinal edge of each tab 3 or extension along the longitudinal dimension of the padded insert 2 or frame. In the case where the sequence of extensions or tabs 3 overlap, the extensions or tabs can be attached to one another by an adhesive, by an attraction between magnets and/or ferromagnetic material attached to the extensions or tabs 3, using snaps, using hook and loop fasteners, or the like.

In some implementations, the magnets 1 on the front side of the frame may be situated to have one polarity and the magnets 1 on the back side of the frame may be situated to have an opposite polarity. In other implementations, the magnets 1 on the front side and/or the back side of the pillow frame may be situated to have different polarities around the perimeter of the padded insert 2. For example, a first magnet 1 attached to the extension or tab 3 on the front side of the padded insert 2 can be situated to have a particular polarity, an adjacent second magnet 1 also attached to the extension or tab 3 on the front side of the padded insert 2 can be situated to have an opposite polarity from the first magnet, a third magnet 1 adjacent to the second magnet and also attached to the extension or tab 3 on the front side of the padded insert 2 can be situated to have the same polarity as the first magnet, and so on. Other patterns of polarities can also be used. In some implementations, instead of using magnets for the front and back extensions and/or detachable/detached frame or tabs 3, some of the magnets 1 can be replaced by steel or other ferromagnetic materials that similarly facilitate closing the channel between the front and back extensions and/or detachable/detached frame or tabs 3.

In general, the extensions and/or detachable/detached frame or tabs 3 are at least as wide as the magnets 1 or ferromagnetic materials such that the magnets 1 or ferromagnetic material does not extend beyond the width of the extensions and/or detachable/detached frame or tabs 3. In addition, the magnets or ferromagnetic materials can be sufficiently small that they do not interfere with enjoyment or aesthetic appearance of the pillow (e.g., less than an inch or less than half an inch, or less than an inch). The magnets or ferromagnetic materials can be spaced around the perimeter of the extension and/or frame such that gaps exist between adjacent magnets and/or ferromagnetic material. In other implementations, the magnets or ferromagnetic materials can be situated to substantially or completely stretch around the perimeter of the extension and/or frame (e.g., such that the adjacent magnets and/or ferromagnetic materials contact or nearly contact one another around the perimeter of the extension and/or frame). The length of each magnet or ferromagnetic material can be limited to provide any desired level of flexibility around the perimeter of a constructed pillow. Alternatively, the perimeter of the extension and/or frame can include solid magnets and/or ferromagnetic strips along at least each side of the pillow frame. In some cases, the solid strips can themselves be flexible (e.g., using a magnetic tape and/or metallic tape), although implementations that are not pliable are also possible. Furthermore, although the figure depicts the magnets 1 being attached along the inside of the channel formed by the front and back extensions or tabs 3, the magnets 1 can alternatively be attached to the extensions or tabs 3 along the surfaces of the extensions or tabs 3 on the outside of the channel. The magnets 1 or ferromagnetic materials can be attached to the extension(s) or frame along all sides (e.g., four sides for a square or rectangular pillow frame) on a generally common plane to form a magnetic outer perimeter.

The illustrated pillow of FIG. 1 further includes a fabric 4 or other pliable material that can be placed around the padded insert 2 such that the magnetic outer perimeter clasps the fabric 4 securely around the padded insert 2. For example, the fabric 4 can include front and back pieces and each piece can be sized to be slightly larger than the padded insert 2. The edges of each piece of fabric 4 can be placed in the channel of the magnetic outer perimeter such that the magnetic attraction between the front and back extensions and/or detachable/detached frame or tabs 3 clamps the fabric 4 in place. In addition, an outer cord 5 with one or more generally planar extensions along its length can further be attached around the perimeter of the padded insert by similarly clasping the planar extensions and/or detachable/detached frame between the front and back extensions and/or detachable/detached frame or tabs 3 (e.g., between the edge portions of the front and back fabric pieces). Alternatively, the outer cord 5 can be attached to the front or back fabric piece 4. In the case of a detached frame, even though the frame is not physically attached to the padded insert 2, the frame can be substantially held in place around the padded insert 2 as a result of the fabric enveloping the padded insert 2 when the fabric 4 and frame or tabs 3 are assembled around the padded insert 2.

FIG. 2 is a cross-sectional view of the pillow shown in FIG. 1. The cross-sectional view shows the fabric 4 enveloping the padded insert 2. Approaching the edge of the fabric 4 (for both the front and back pieces of fabric), the fabric 4 wraps along the outside of the extensions and/or detachable/detached frame or tabs 3, around the end of the extensions and/or detachable/detached frame or tabs 3, and into the channel or space formed by the extensions and/or detachable/detached frame or tabs 3. The magnets 1 on the extensions and/or detachable/detached frame or tabs 3 cause the extensions and/or detachable/detached frame or tabs 3 to clasp the fabric 4 in the channel. The magnets on the extensions and/or detachable/detached frame or tabs 3 also cause the extensions and/or detachable/detached frame or tabs 3 to clasp a tab or tabs of a decorative perimeter cord 5 (i.e., the tabs of the decorative perimeter cord are sandwiched between the edge of the top piece of fabric 4 and the edge of the bottom piece of fabric 4, which in turn are sandwiched between the magnet or ferromagnetic material 1 attached to the top tab 3 and the magnet or ferromagnetic material 1 attached to the bottom tab 3 as shown in FIG. 2). In some implementations, one or more magnets and/or ferromagnetic material can be attached to the tab or tabs of a decorative perimeter cord 5 and positioned to interact with the magnets and/or ferromagnetic material on the extensions and/or detachable/detached frame or tabs 3 to cause the extensions and/or detachable/detached frame or tabs 3 to clasp the pieces of fabric 4 and the tab or tabs of the decorative perimeter cord 5. In alternative embodiments, the cord 5 can be physically attached to the edge of one of the pieces of fabric 4 (e.g., a tab of the decorative perimeter cord 5 can be sewn or adhered to the edge of the top or bottom piece of fabric 4).

The magnets and/or ferromagnetic material can be selected such that the magnetic attraction is sufficient to clamp the decorative fabric in place to prevent it from too easily slipping out from between the extensions and/or detachable/detached frame or tabs 3 but is not so strong that the channel is too difficult to keep open when assembling.

Figure 4:
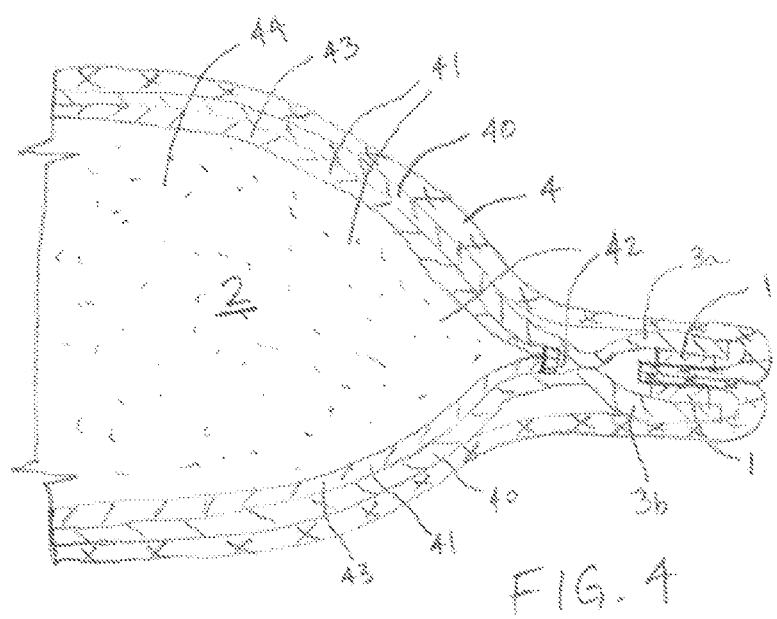
FIG. 4 is a cross-sectional view of a padded insert enclosed in a shell having a magnetic pillow frame that is covered in a decorative fabric.
Figure 5:
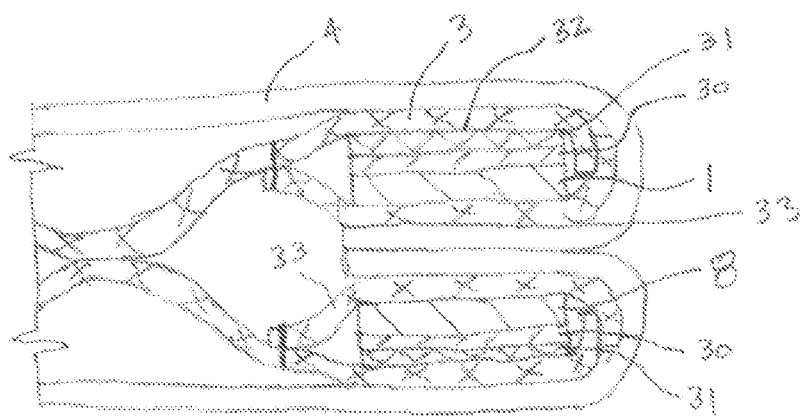
FIG. 5 is a cross-sectional view of a padded insert covered in a decorative fabric using an attached magnetic pillow frame.

Implementations of the frame can incorporate stuffing material (i.e., the magnetic components are affixed as an extension to a padded insert as depicted in FIG. 2) or can be made to envelop stuffing material. In addition, the padded insert can include foam or other padded material. In some implementations, the frame can be made to envelop a separate padded insert (e.g., by creating a shell 40, not affixed to the insert 41, which surrounds an existing padded insert 41 as depicted in FIG. 4). For example, the frame could include a cavity 42 with a zipper along one side, such that a padded insert 2 or pillow stuffing can be inserted into and contained within the frame so that the extensions or tabs 3 can be added to an existing padded insert or so that the frame (and decorative fabric) can be stuffed with stuffing material. Alternatively, as depicted in FIG. 5, the frame could include an adhesive strip 45 that adheres the extensions and/or detachable/detached frame or tabs 3 to the perimeter of a separate padded insert 2 (i.e., by attaching a magnetic frame as a border to a padded insert). Other alternatives can include joining two padded inserts together with a magnetic clasping device, nesting magnets inside a padded insert, or sewing or adhering a permanent seam on any side of the padded insert and affixing a magnetic seam on the unsealed sides. As another example, the front and back pieces of fabric could be sewn or otherwise attached to one another (with or without a decorative cord) on one or more sides or portions of the perimeter (e.g., to create an open clam-like covering or a pocket), while one or more of the other sides or portion of the perimeter can be closed using extensions or tabs 3 and/or a partial frame as described in this specification. It is noted that the padded insert may or may not include stuffing material, and, in some cases, the padded insert may be stuffing material that is enveloped by the pillow frame and the decorative exterior fabric. In other cases, as depicted in FIG. 4, the padded insert 41 may include a fabric 43 that forms an enclosed cavity, which holds stuffing material 44. In some implementations a lightweight lining, interfacing, or facing fabric 33, as depicted in FIG. 6, can be used to encase the tabs (i.e., the fabric 33 can encase the tabs such that the magnets and/or ferromagnetic material is hidden behind the fabric 33 and is not exposed when the channel is open). Such encasing fabric 33 can help protect the magnets 1 and/or ferromagnetic material 8 from inadvertently becoming dislodged from the tabs. In addition, a lightweight lining, interfacing, or facing fabric 33 can also be secured to the tabs 3 to maintain the structure of the perimeter of the frame and/or form insert. In some implementations, the padded insert can be loose pillow stuffing or the pillow stuffing can be encased in (sewn into) a covering material to maintain the general shape of the insert and keep the stuffing contained.

In general, the frame can be constructed, apart from the magnets and any ferromagnetic material, from fabric or other pliable materials. Thus, the term "frame" is not intended to imply any rigidity to the apparatus. Rather, the term is, in part, intended to convey that the magnetic outer perimeter frames a padded insert, regardless of whether the padded insert is included as part of the frame or can be added as a separate component.

In one example of use, a person could purchase the fabric or material of their choice in the dimensions needed to cover the front and back side of a desired padded insert. They would then center the material on the outside of the form to cover the insert. Next, they fold the outside edge of material over the magnetic extension or frame into the channel and clasp the front and back extensions and/or detachable/detached frame or tabs 3 together to form a seam.

Accordingly, an apparatus in accordance with this description can include suitable types, gauss levels, sizes, and grades of magnets which are affixed to or nested inside a padded insert, either covering the whole surface area of the outside perimeter, or by allowing for a space in between the magnets that will fasten, clasp, seam, and encase any suitable type of pliable material around the padded insert for decorative purposes.

Thus, particular implementations of the invention have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A magnetic closure system for encasing insert padding comprising:
   a plurality of opposing tabs having a generally longitudinal dimension coupled together to form a frame operable to extend substantially around a perimeter of a padded insert, wherein the plurality of opposing tabs include:
   one or more first tabs each having a first edge and a second edge extending along the generally longitudinal dimension of the respective first tab, wherein each of the respective first tab includes at least one of a magnetic or ferromagnetic material disposed along the generally longitudinal dimension of the respective first tab; and one or more second tabs corresponding to each of the one or more first tabs and each having a first edge and a second edge extending along the generally longitudinal dimension of the respective second tab, wherein each of the respective second tab includes at least one of a magnetic or ferromagnetic material disposed along the generally longitudinal dimension of the respective second tab, with the first edge of each respective first tab being affixed in a close relative proximity to the first edge of the corresponding second tab;

wherein each respective first tab and the corresponding second tab are operable to releasably clamp together as a result of an attractive magnetic force that causes the respective magnetic or ferromagnetic materials of each respective first tab and the corresponding second tab to clasp a pliable material between the respective first tab and corresponding second tab and releasably hold the material in a fixed position to at least partially envelop a padded insert, with the pliable material being configured to at least partially envelop the padded insert, and wherein the one or more first tabs and the one or more corresponding second tabs collectively are operable to hold the material substantially around the perimeter of the padded insert.

2. The magnetic closure system of claim 1 further comprising the padded insert, wherein the plurality of opposing tabs are disposed around at least a portion of the perimeter of the padded insert.

3. The magnetic closure system of claim 1 wherein the plurality of opposing tabs are adapted to be attachable to and detachable from the padded insert using a plurality of fasteners.

4. The magnetic closure system of claim 1 wherein the plurality of opposing tabs are attached to a shell having a cavity adapted to enclose the padded insert.

5. The magnetic closure system of claim 1 wherein the plurality of opposing tabs comprise an extended seam allowance of fabric that envelops stuffing of the padded insert.

6. The magnetic closure system of claim 1 wherein the plurality of opposing tabs include an adhesive strip adapted to adhere the plurality of opposing tabs to a perimeter of a separate padded insert.

7. The magnetic closure system of claim 1 wherein the magnetic or ferromagnetic materials are affixed to a composite material and the composite material is affixed to a tab substrate by an adhesive.

8. The magnetic closure system of claim 1 wherein the magnetic or ferromagnetic materials are encased between a tab substrate and an encasing fabric.

9. The magnetic closure system of claim 1 wherein the magnetic or ferromagnetic materials are spaced apart along the generally longitudinal dimension of each of the one or more first tabs and one or more second tabs.

10. The magnetic closure system of claim 1 further comprising the padded insert, wherein the plurality of opposing tabs are attached to the padded insert substantially around the perimeter of the padded insert.

* * * * *